United States Patent [19]

Tanabe et al.

[11] Patent Number: 5,084,605
[45] Date of Patent: Jan. 28, 1992

[54] WELDING TORCH HAVING IMPROVED GAS JETTING CAPABILITY

[75] Inventors: Katuji Tanabe; Kazuharu Fujii, both of Tokyo, Japan

[73] Assignee: Obara Corporation, Tokyo, Japan

[21] Appl. No.: 614,919

[22] Filed: Nov. 16, 1990

[30] Foreign Application Priority Data

Nov. 22, 1989 [JP] Japan .............................. 1-134928[U]

[51] Int. Cl.$^5$ .............................................. B23K 9/173
[52] U.S. Cl. .............................................. 219/137.42
[58] Field of Search ....................... 219/74, 75, 137.42

[56] References Cited

U.S. PATENT DOCUMENTS 4,101,751 7/1978 Urbanic et al. ..................... 219/74
4,788,401 11/1988 Kleppen ......................... 219/137.42

Primary Examiner—Clifford C. Shaw
Attorney, Agent, or Firm—Flynn, Thiel, Boutell & Tanis

[57] ABSTRACT

There is disclosed a welding torch provided with orifice plate. The orifice plate is screwed to an outer circumference of a gas diffuser and has a plurality of apertures staggered in the peripheral surface thereof in the axial direction thereof.

7 Claims, 1 Drawing Sheet

WELDING TORCH HAVING IMPROVED GAS JETTING CAPABILITY

BACKGROUND OF THE INVENTION

1. Field of the Invention

The present invention relates to a welding torch provided with an orifice plate, particularly to an improvement of the orifice plate disposed between a gas diffuser and a nozzle.

2 Prior Art

An orifice plate of the conventional welding torch which is disposed between a gas diffuser and a nozzle and has a plurality of apertures in the periphery thereof is arranged in one line for receiving the gas from the diffuser and diffusing the same gas toward the nozzle through apertures defined on the peripheral surface of the orifice plate.

The conventional orifice plate has, however, such a problem that the gasses diffused through the apertures toward the nozzle are interacted since the plurality of apertures are arranged in one line whereby the force of diffusing or jetting the gas is reduced, which entails in preventing a uniform diffusion of the gas.

The present invention has been made to solve the problem set forth above and to provide a welding torch provided with an orifice plate having a plurality of apertures arranged staggered in the peripheral surface thereof and capable of reducing the interaction of the gasses discharged through the apertures, thereby obtaining a powerful and uniform discharging or, jetting force.

The above and other objects, features and advantages of the present invention will become more apparent from the following description taken in conjunction with the accompanying drawings.

DESCRIPTION OF THE PREFERRED EMBODIMENT

Figure 1:
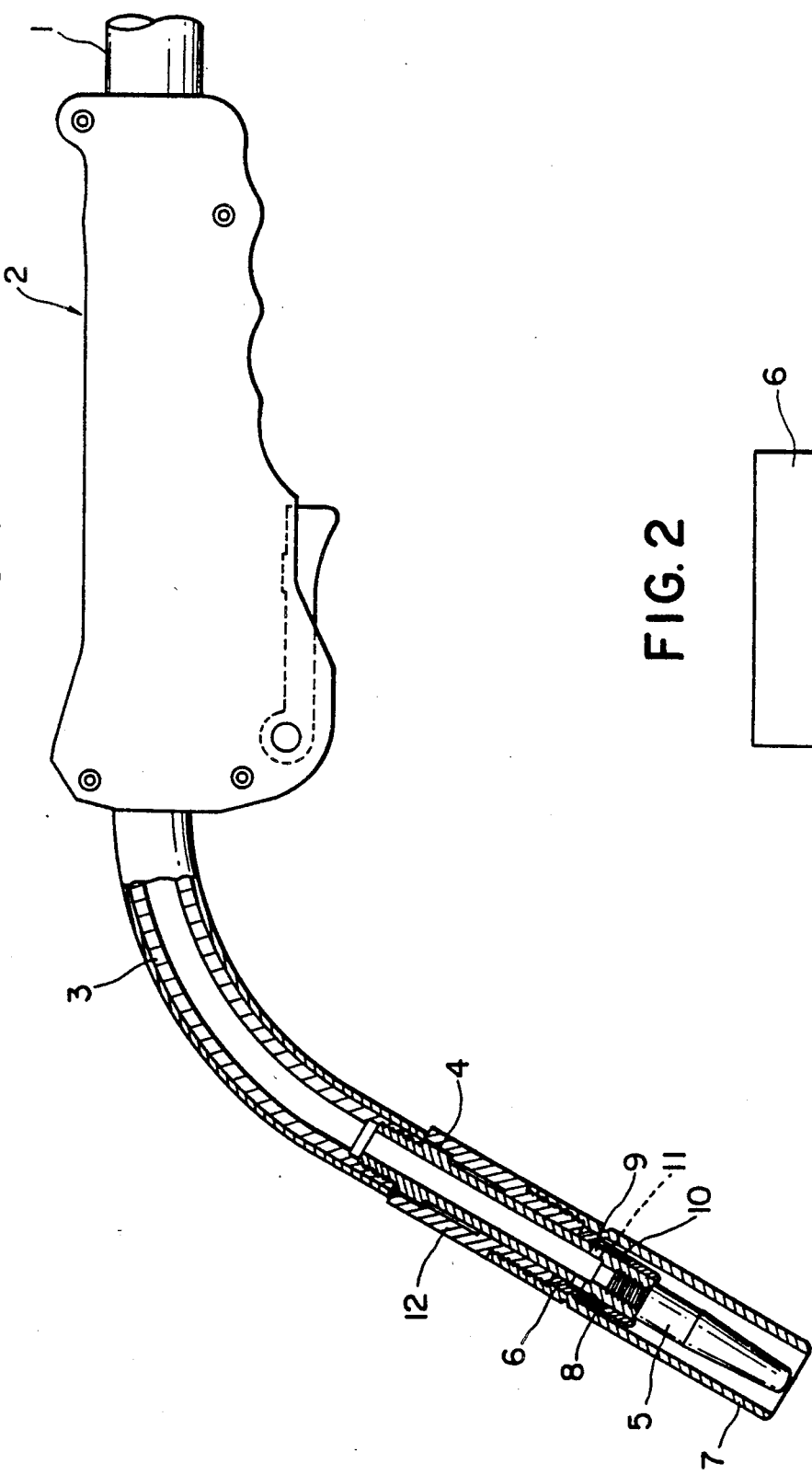
FIG. 1 is a partly cut away perspective view of a welding torch provided with orifice plate according to a preferred embodiment of the present invention.

A welding torch provided with orifice plate according to a preferred embodiment of the present invention will be described with reference to FIGS. 1 and 2.

The welding torch provided with orifice plate comprises a welding cable for supplying wires, gasses and the like necessary for welding, a conductor tube 3 connected to the welding cable 1 for receiving the wires, gas, and the like, a gas diffuser 4 connected to the conductor tube 3 for receiving the gas from the conductor tube 3 and diffusing the gas, an orifice plate 6 screwed at the outer circumference of the gas diffuser 4, the orifice plate 6 having a plurality of apertures 10 and 11 which are staggered in the periphery thereof in the axial direction thereof, a nozzle 7 disposed at the outer circumference of the orifice plate, and welding tips screwed at the distal end of the gas diffuser. There is also provided a nozzle insulator 12 between the outer surface of the gas diffuser 4 and the inner surface of the nozzle 7 and confronting with the orifice plate 6.

The gas diffuser 4 has a plurality of perforations 9 at the outer circumference thereof formed by perforating the peripheral surface thereof for supplying the gas into a gas collector 8. The gas collected in the gas collector 8 is jetted into the nozzle 7 through the plurality of apertures 10 and 11 and supplied to the outer circumference of the welding tips.

Figure 2:
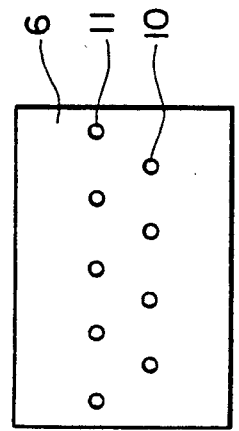
FIG. 2 an exploded view of an orifice plate employed in the welding torch in FIG. 1.

The orifice plate 6 having the plurality of apertures 10 and 11 is exploded as illustrated in FIG. 2 in which the apertures 10 arranged at the side of the welding tips 5 and the apertures 11 at the side of the nozzle insulator 12 are arranged to be staggered in the circumferential direction of the orifice plate 6.

With the arrangement of the welding torch provided with orifice plate, when the gas is fed from the cable 1 into the gas diffuser 4 via the conductor tube 3, the gas is diffused from the perforation 9 into the gas collector 8. The gas in the gas collector 8 is uniformly jetted toward the outer circumference of the welding tips through the plurality of apertures 10 and 11 without interacting in the nozzle 7.

According to the present invention, the plurality of apertures are defined on the peripheral surface of the orifice plate to be staggered in the circumferential direction thereof for jetting the gas diffused from the gas diffuser toward the nozzle so that the gasses are jetted into the nozzle uniformly with strong force and less interaction in the nozzle. Accordingly, a welding or cutting operation is made in the best atmosphere.

Although the invention has been described in its preferred form with a certain degree of particularity, it is to be understood that many variations and changes are possible in the invention without departing from the scope thereof.

What is claimed is:

1. A welding torch, comprising:
   a gas diffuser connected to a welding cable for receiving gas therefrom and diffusing the gas;
   an axially elongated, tubular orifice plate attached to said gas diffuser adjacent the outer circumference thereof for jetting gas outwardly away from the gas diffuser, the orifice plate having an axially elongated tubular sidewall with a plurality of apertures which extend generally radially therethrough and permit the gas to flow from inside said tubular orifice plate radially outwardly through said tubular sidewall, said orifice plate including first and second groups of said apertures, said first group of apertures being spaced axially from said second group of apertures, said apertures of said first group being disposed in both circumferentially and axially nonoverlapping relationship relative to said apertures of said second group;
   a nozzle disposed adjacent the outer circumference of the orifice plate; and
   welding tip means attached to the distal end of the gas diffuser for producing an arc between the welding torch and a workpiece.

2. A welding torch according to claim 1, wherein said apertures of each said group are arranged in axially overlapping relationship relative to the remaining apertures in the respective group, said apertures of each said group being approximately equally circumferentially space around said tubular sidewall.

3. A welding torch according to claim 2, wherein said gas diffuser includes a tubular wall portion which is axially received includes a tubular sidewall of said orifice plate, said welding torch including means for defining an annular gas collection chamber between said tubular wall portion and said tubular sidewall, said apertures of said orifice plate communicating with said gas collection chamber, and said tubular wall portion having perforations therein which extend therethrough and communicate with said gas collection chamber.

4. A welding torch according to claim 3, wherein said gas collection chamber includes an annular groove formed in one of said tubular wall portion and said tubular sidewall, said annular groove opening toward the other of said tubular wall portion and said tubular sidewall.

5. A welding torch according to claim 4, wherein said annular groove is formed in an inner peripheral surface of said tubular sidewall and directly adjoins said apertures.

6. A welding torch according to claim 3, wherein said tubular sidewall of said orifice plate is threaded onto said tubular wall portion of said gas diffuser, said welding tip means being axially received in said tubular wall portion, and said tubular wall portion being threaded onto said welding tip means.

7. A welding torch according to claim 1, including a conductor tube connected between said welding cable and said gas diffuser for transporting gas therebetween.

* * * * *

UNITED STATES PATENT AND TRADEMARK OFFICE
CERTIFICATE OF CORRECTION

PATENT NO. : 5 084 605
DATED : January 28, 1992
INVENTOR(S) : Katuji Tanabe et al It is certified that error appears in the above-identified patent and that said Letters Patent is hereby corrected as shown below:

Column 2, line 63; change "space" to ---spaced---.
Column 2, line 66; change "includes a" to ---in said---.

Signed and Sealed this

Eleventh Day of May, 1993

Attest:

MICHAEL K. KIRK

Attesting Officer

Acting Commissioner of Patents and Trademarks